Figure 4:
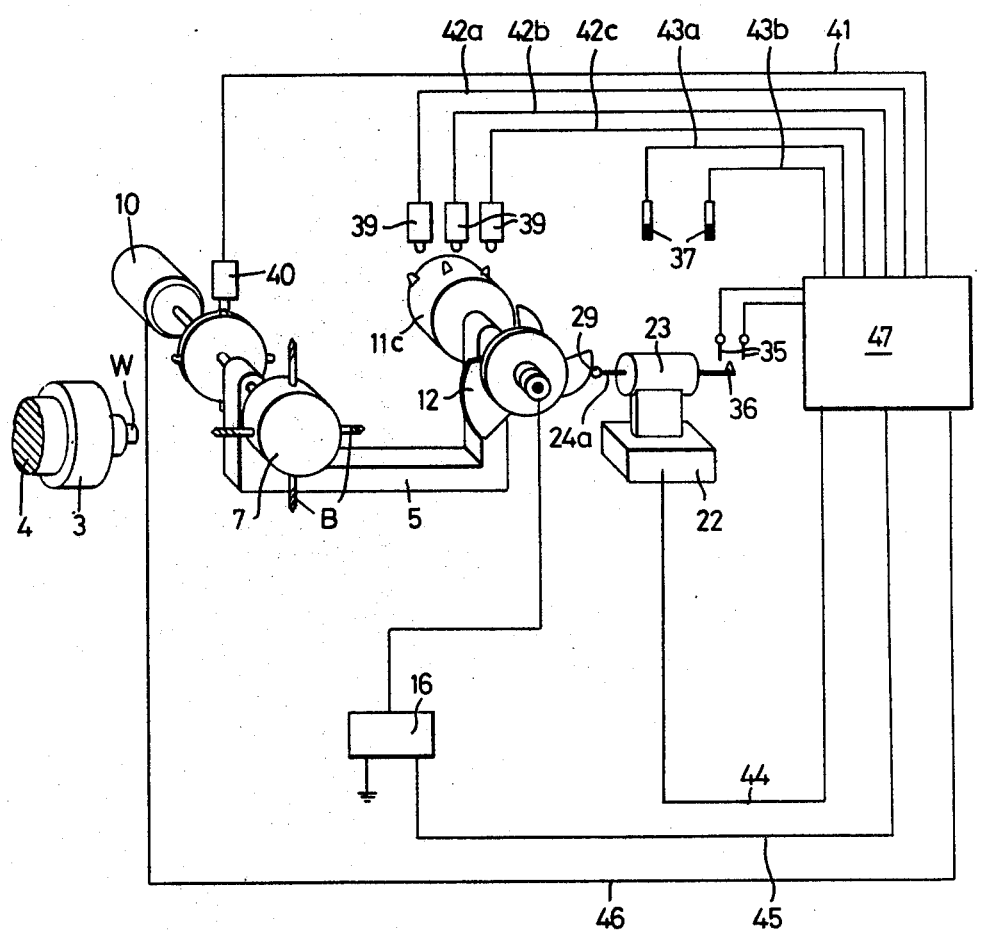

United States Patent [19]
Bechler

[11] 4,089,241
[45] May 16, 1978

[54] AUTOMATIC TURRET LATHE

[76] Inventor: André Bechler, 4, rue Centrale, 2740 Moutier (Canton of Berne), Switzerland

[21] Appl. No.: 788,038

[22] Filed: Apr. 15, 1977

[30] Foreign Application Priority Data

Apr. 20, 1976 Switzerland .................. 4931/76

[51] Int. Cl.² ............................................. B23B 21/00
[52] U.S. Cl. .................................................. 82/21 A
[58] Field of Search ............... 82/2 R, 2 B, 2 C, 21 A, 82/21 B, 25

[56] References Cited

U.S. PATENT DOCUMENTS

| 3,060,466 | 10/1962 | Kozacka | 82/21 A |
| 3,107,581 | 10/1963 | Ackerman | 82/21 A |
| 3,854,352 | 12/1974 | Fortune | 82/21 A |

FOREIGN PATENT DOCUMENTS

| 956,511 | 4/1964 | United Kingdom | 82/21 A |
| 1,225,750 | 3/1971 | United Kingdom | 82/21 A |

*Primary Examiner*—Harrison L. Hinson
*Attorney, Agent, or Firm*—McNenny, Pearne, Gordon, Gail, Dickinson & Schiller

[57] ABSTRACT

An automatic lathe for machining workpieces mounted on the headstock thereof, each part being subjected to a cycle of diverse operations effected by tools mounted on an indexable turret. A control rotor provided with cams is driven rotatingly and moves the carriage of the lathe longitudinally while resting against a support member which forms part of the movable portion of a jack and which is displaceable during the cycle of operations by control of an electromagnetic switch valve.

5 Claims, 4 Drawing Figures

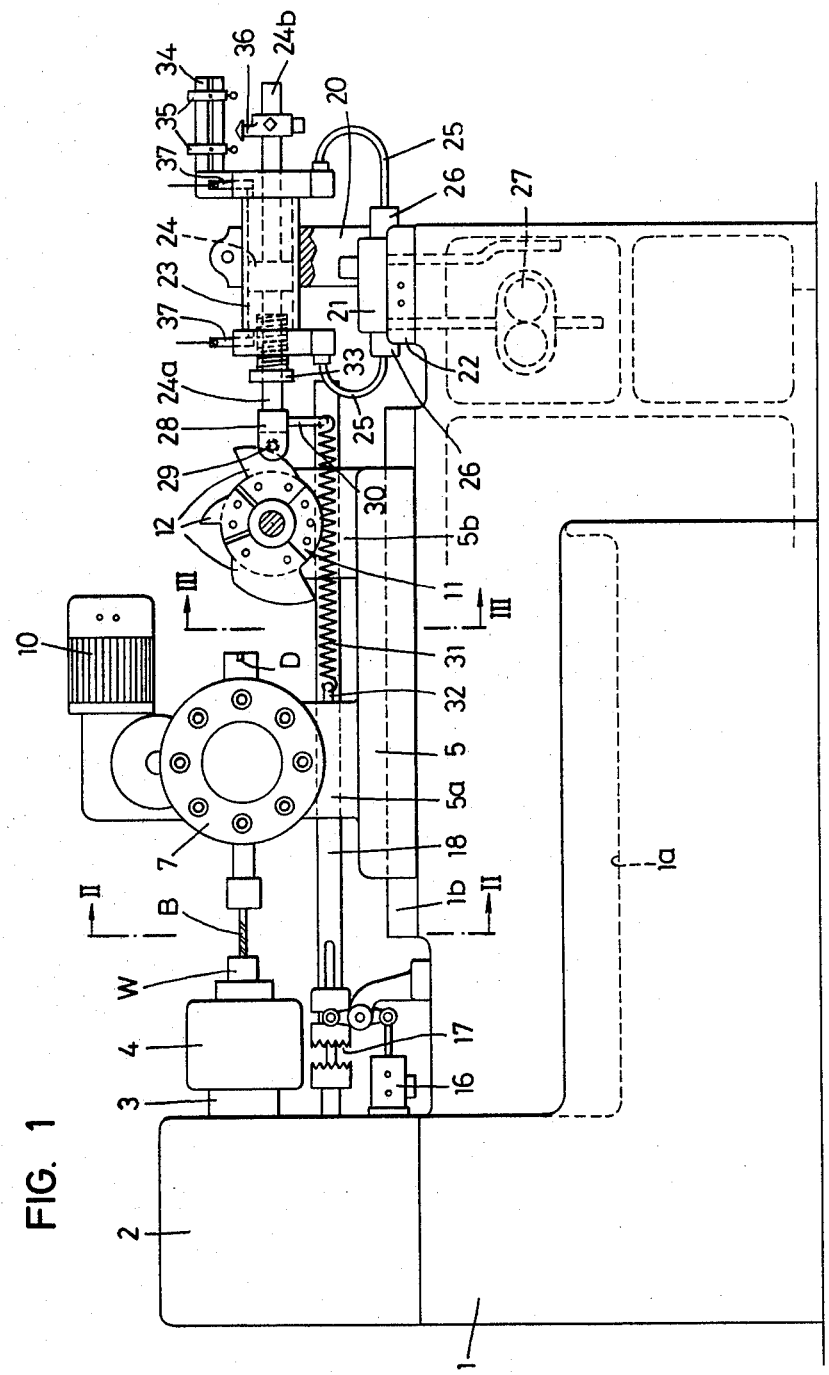

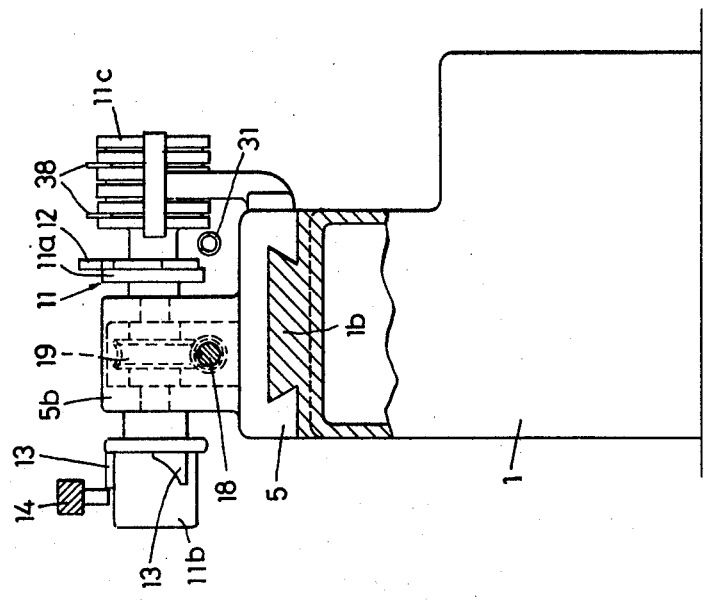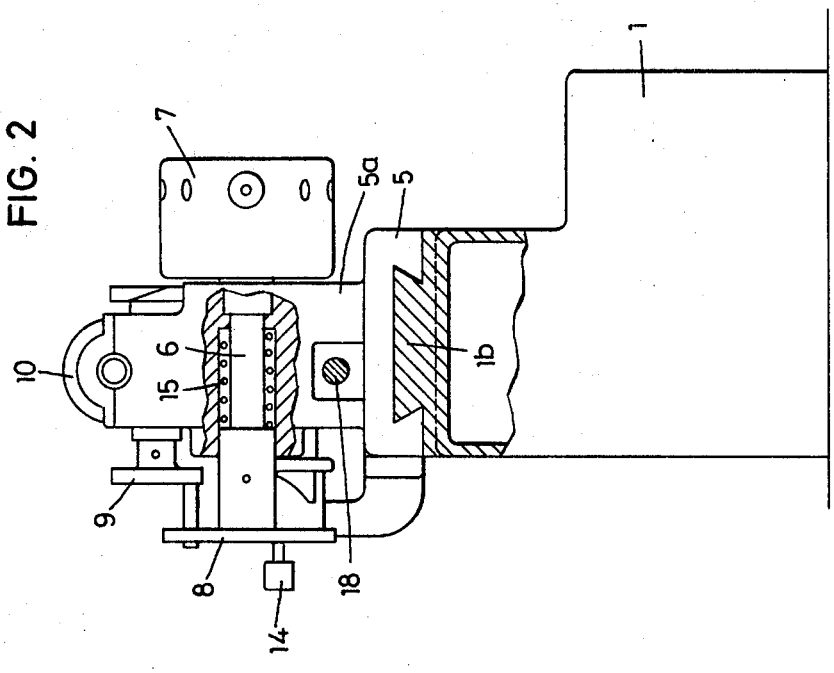

AUTOMATIC TURRET LATHE

This invention relates to an automatic lathe of the type comprising a bed, a rotary work spindle, a carriage movable parallel to the axis of rotation of the work spindle, a tool turret mounted on the carriage and indexable about an axis perpendicular to the axis of rotation of the work spindle, a continuously rotatable control rotor mounted on the carriage and bearing radial cam elements, and a support member mounted on the bed, the cam elements coming to rest upon the support member for controlling advancing movements of the carriage.

In an automatic lathe of this type disclosed in German Pat. No 1,267,937, the support member with which the radial cam elements cooperate takes the form of a simple support which can be adjusted over a short path after loosening of a screw bolt securing it to the lathe bed. Such adjustment takes place each time the lathe is set up for processing a particular series of workpieces.

It is an object of this invention to provide an improved automatic turret lathe having a considerably broadened range of processing possibilities, particularly for longer workpieces, without the necessity of any corresponding enlargement of the radial cam elements provided on the control rotor for controlling the longitudinal feed.

A further object of this invention is to provide a means of overcoming the difficulties associated with the control aspects of an improved automatic lathe designed to achieve the foregoing object.

To this end, in the automatic lathe according to the present invention, the improvement comprises a control device including a movable part integral with the support member and control means for causing the support member to effect controlled rectilinear movements parallel to the axis of rotation of the work spindle during the operating cycle of the lathe.

A preferred embodiment of the invention will now be described in detail with reference to the accompanying drawings, in which:

FIG. 1 is a simplified, diagrammatic elevation of an automatic turret lathe according to the invention, FIG. 2 is a partial cross-section taken on the line II—II of FIG. 1, FIG. 3 is a partial cross-section taken on the line III—III of FIG. 1, and FIG. 4 is a simplified block diagram illustrating individual electrical elements and appurtenant control connections.

The basic principle of the automatic lathe illustrated in the drawings is similar to that of the lathe disclosed in the aforementioned German Pat. No. 1,267,937. It comprises a bed 1 which bears a headstock 2 at one end, forms a trough 1a midway along its length towards the front, and has a longitudinal guideway 1b on top. Mounted in the headstock 2 is a work spindle 3 provided with a chuck 4 and driven by motor means (not shown). A longitudinal carriage 5 is movably guided by the guideway 1b in the direction of the axis of the work spindle 3, i.e., the lonitudinal axis of the lathe. In a bearing structure 5a, the carriage 5 bears a shaft 6 which is disposed perpendicular to the longitudinal axis of the lathe and to the front end of which a tool turret 7 is secured, whereas the rearward end of the shaft 6 is fixed to the driven disc 8 (FIG. 2) of a Maltese cross transmission, the driving portion 9 of which is driven by an electric motor 10 via a worm drive (not shown); the elements 8, 9, and 10 form part of a stepping device for the tool turret 7, which can be locked in its various working positions by known means.

In a second bearing structure 5b of the carriage 5, a control rotor 11 is similarly mounted for rotation about an axis perpendicular to the longitudinal axis of the lathe. Detachably secured to one face of an annular flange 11a of the control rotor 11 are radial cam elements 12 for the longitudinal feed; axial cam elements 13 for the cross feed are detachably secured to a drum-like portion 11b of the control rotor 11. The cam elements 13 are driven by a lever 14 (FIGS. 2 and 3) which is mounted on the carriage 5, acts upon the disc 8, and thus moves the shaft 6 together with the tool turret 7 axially against the bias of a spring 15. The control rotor 11 may be rotatingly driven by a separate electric motor; for certain types of processing, e.g., thread cutting, this drive may be taken off the work spindle 3 via a variable gear in a conventional manner. However this may be, this drive is transmitted in the present embodiment via an electromagnetically engageable and disengageable coupling device 17, utilizing an electromagnet 16, to a shaft 18 disposed parallel to the longitudinal axis of the lathe. The shaft 18 passes through the bearing structure 5a and exhibits, in the vicinity of the bearing structure 5b, a keyway in which a key is displaceably engaged, this key being fixed in a worm which is rotatingly but non-displaceably mounted in the bearing structure 5b. This worm transmits the rotational drive to a worm wheel 19 secured to the control rotor 11.

Mounted on the end of the bed 1 remote from the headstock 2 are a support 20 and a hydraulic switch valve 21 together with an electromagnet 22 for operating the valve 21. The support 20 bears a jack composed of a cylinder 23 clamped in the support 20 and a double-acting piston 24. The two chambers of the cylinder 23 are connected via pipelines 25 and relief pressure valves 26 to the outlets of the switch valve 21, the inlet of which is connected via a further relief pressure valve (not shown) to an oil-pressure pump 27. A portion 24a of a piston rod bears a stirrup 28, with a support pin 29 or the like, and a lateral finger 30 attached to one end of a strong traction spring 31, the other end of which is hooked to a fixed part secured to the bearing structure 5a; the spring 31 ensures that in every position of the control rotor 11 and in every position of the piston 24, there is a pressure contact between one of the radial cam elements 12 and the pin 29. This means that the longitudinal feed of the carriage 5 together with the tool turret 7 is always determined by the radial cam elements 12 on the one hand and by the position of the piston 24 on the other hand. The left-hand portion 24a of the piston rod (as viewed in FIG. 1) slides in a stop sleeve 33 which is screwingly adjustable in the cylinder 23 and cooperates with the piston 24.

Disposed on a rail 34 which is positioned parallel to the longitudinal axis of the lathe and rigidly secured to the cylinder 23 are longitudinally adjustable electrical sensing contactors 35 which can be actuated by a feeler 36 mounted on a portion 24b of the piston rod. Inserted in the end walls of the cylinder 23 are electrical pressure sensors 37 which respond to a predetermined pressure of the oil in the adjoining cylinder chamber. Secured to a portion 11c (FIG. 3) of the control rotor 11 are circumferentially adjustable ramp elements 38 which cooperate with sensing contactors 39 (FIG. 4) mounted on the bearing structure 5b. Similar sensing contactors 40, also shown in FIG. 4, are associated with the tool turret 7 for sensing the working positions thereof, especially those occupied by a tool.

Also provided are electrical control connections 41; 42a, 42b, 42c; 43a, 43b, 44, 45, and 46, and a programming unit 47 which are illustrated in a very simplified manner in FIG. 4 because they are well-known per se in control technology and also because they may take the most varied forms. In cooperation with the aforementioned sensing contactors and pressure sensors, as well as with electromagnets as the one denoted 22, the control connections 41–46 and unit 47 bring about the automatic progress of successive operating cycles and, within each such cycle, a pre-adjustable sequence of movements—likewise pre-adjustable in their magnitude —of the piston 24, the control rotor 11, and the tool turret 7 as regards the advance thereof.

One important advantage resulting from the arrangement of the support pin 29, cooperating with the radial cam elements 12, at one end of the piston rod of an adjusting piston is that long longitudinal feed paths, say, that of a drill bit B, can be effected by means of the piston 24 instead of the radial cam elements 12; hence the latter accordingly need not project out very far and may be reserved for the precise control of the longitudinal feed in those phases of an operating cycle in which particular portions of a workpiece W are profiled by means of turning tools D which, as the case may be, are also subjected to cross-feed movements.

In a typical example of processing, the piston 24 will be kept pressed against the stop sleeve 33 by the oil pressure during most of the operating cycle, while the carriage 5 will thus assume a precisely adjustable left-hand end position for the profiling, the feeds being controlled by the cam elements 12 and 13; before a long drill bit such as B comes into use, and also thereafter, the piston 24 is moved all the way to the right; the latter is then advanced over a distance which is controlled by the action of the part 36 upon one of the sensing contactors 35, whereupon the carriage 5 is moved towards the right (FIG. 1) at least for the following retraction of the drill bit and the unimpeded indexing of the turret 7.

Certain ones of the sensing contactors 35 may be used in cooperation with associated control connections for controlling the speed of longitudinal feed movements brought about by the piston 24 (or displacements of the carriage 5 towards its end positions), e.g., by varying the speed of rotation of the electric motor driving the pump 27.

Longitudinal feed movements during operation will usually take place towards the left (as viewed in FIG. 1). Care is then to be taken that by means of one of the axial cam elements 13, the turret 7, for retraction, is brought into a transverse position such that the tool which has just been working, especially the turning tool, is lifted off the workpiece and does not come in contact with any portion thereof during such retraction.

What is claimed is:

1. In an automatic lathe of the type comprising a bed, a rotary work spindle, a carriage movable parallel to the axis of rotation of said spindle, a tool turret mounted on said carriage and indexable about an axis perpendicular to the axis of rotation of said spindle, a continuously rotatable control rotor mounted on said carriage and bearing radial cam elements, and a support member mounted on said bed, said cam elements coming to rest upon said support member for controlling advancing movements of said carriage, the improvement comprising:
 a control device including a movable part integral with said support member and
 control means for causing said support member to effect controlled rectilinear movements parallel to the axis of rotation of said spindle during the operating cycle of said lathe.

2. An automatic lathe in accordance with claim 1, wherein said control device comprises a hydraulic jack including a cylinder, a piston, and a piston rod having a longitudinal axis parallel to the axis of rotation of said spindle, said support member being integral with one end of said piston rod, and said control means comprising an electromagnetic switch valve for actuating said jack and sensing contactors cooperating with said tool turret and with said piston rod for controlling said electromagnetic switch valve.

3. An automatic lathe in accordance with claim 2, wherein said control means further comprise pressure sensors capable of measuring the pressure of oil in said cylinder for further controlling said switch valve.

4. An automatic lathe in accordance with claim 2, wherein said control means include sensing means, further comprising drive means for said work spindle, a shaft, an electromagnetic coupling for connecting said shaft to said drive means, and a worm gear cooperating with said shaft for driving said control rotor, said electromagnetic coupling including an electromagnet connected to said control means for causing automatic engagement or disengagement of said coupling means at predetermined intervals during the operating cycle of said lathe in response to said sensing means.

5. An automatic lathe in accordance with claim 4, further comprising electromagnets connected to said control means, wherein said tool turret comprises locking means for locking each tool of said tool turret in working position, said locking means being controlled by said electromagnets.

* * * * *